(12) United States Patent
Mueller

(10) Patent No.: US 11,291,170 B2
(45) Date of Patent: Apr. 5, 2022

(54) SYSTEM AND METHOD FOR RECLAIMING AND OPTIMIZING LAND

(71) Applicant: Earth Purified LLC, Plymouth, WI (US)

(72) Inventor: Jeff Mueller, Plymouth, WI (US)

(73) Assignee: Earth Purified LLC, Plymouth, WI (US)

( * ) Notice: Subject to any disclaimer, the term of this patent is extended or adjusted under 35 U.S.C. 154(b) by 0 days.

(21) Appl. No.: 16/866,061

(22) Filed: May 4, 2020

(65) Prior Publication Data

US 2020/0260664 A1    Aug. 20, 2020

Related U.S. Application Data

(63) Continuation of application No. 16/226,001, filed on Dec. 19, 2018, now Pat. No. 10,638,674.

(Continued)

(51) Int. Cl.
| | |
|---|---|
| *A01G 25/06* | (2006.01) |
| *A01G 25/16* | (2006.01) |
| *E02B 11/00* | (2006.01) |
| *C02F 1/44* | (2006.01) |
| *B09C 1/02* | (2006.01) |

(52) U.S. Cl.
CPC ........... *A01G 25/06* (2013.01); *A01G 25/165* (2013.01); *B09C 1/02* (2013.01); *C02F 1/441* (2013.01); *E02B 11/005* (2013.01); *B09C 2101/00* (2013.01); *C02F 2201/002* (2013.01); *C02F 2209/001* (2013.01); *C02F 2209/006* (2013.01); *C02F 2307/14* (2013.01); *E02B 2201/50* (2013.01)

(58) Field of Classification Search
CPC ........ A01G 25/06; A01G 25/165; B09C 1/02; B09C 2101/00; B09C 1/007; C02F 2201/002; C02F 2209/001; C02F 2209/006; C02F 2307/14; E02B 2201/50; E02B 11/005
See application file for complete search history.

(56) References Cited

U.S. PATENT DOCUMENTS

| | | | | |
|---|---|---|---|---|
| 5,007,771 | A | * | 4/1991 | Fu .............................. B09C 1/10 405/128.75 |
| 5,252,226 | A | * | 10/1993 | Justice .................... B09C 1/002 175/62 |

(Continued)

OTHER PUBLICATIONS

International Search Report and Written Opinion for PCT/US2018/066525 dated Mar. 21, 2019.

(Continued)

*Primary Examiner* — Carib A Oquendo
(74) *Attorney, Agent, or Firm* — Christopher M. Scherer; DeWitt LLP

(57) ABSTRACT

The present invention is a system for treating land, either to reclaim or optimize the land. Embedded subsurface pipes deliver water to the land. The water may be loaded with soil-treating additives. As water streams from the pipes, it treats the land before passing into a drainage ditch around the periphery of the land. The water is removed from the ditch and recycled, removing contaminants (in reclamation operations) or adding more additives (in optimization operations), before returning to the pipes for another round of treatment, if necessary.

20 Claims, 12 Drawing Sheets

Related U.S. Application Data

(60) Provisional application No. 62/610,484, filed on Dec. 26, 2017.

(56) References Cited

U.S. PATENT DOCUMENTS

| | | | | |
|---|---|---|---|---|
| 5,258,303 | A | * | 11/1993 | Stenger ............... B09C 1/10 435/262 |
| 5,716,164 | A | | 2/1998 | Biro et al. |
| 5,836,718 | A | * | 11/1998 | Price .................. B09C 1/06 405/128.8 |
| 5,885,203 | A | | 3/1999 | Pelletier |
| 2003/0133756 | A1 | | 7/2003 | Rhee |

OTHER PUBLICATIONS

International Preliminary Report on Patentability for PCT/US2018/066525 dated Mar. 21, 2019.

\* cited by examiner

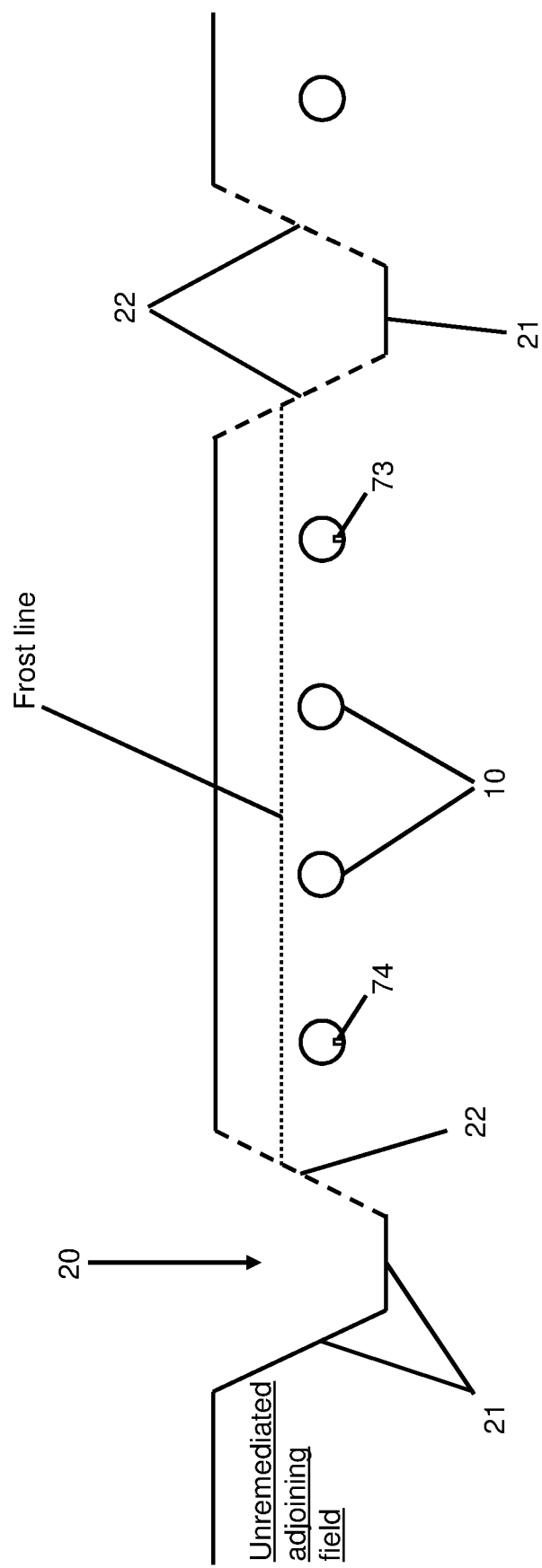

SYSTEM AND METHOD FOR RECLAIMING AND OPTIMIZING LAND

CROSS-REFERENCE TO RELATED APPLICATIONS

This application is a continuation of U.S. patent application Ser. No. 16/226,001, filed on Dec. 19, 2018, which application claims the benefit of prior-filed, U.S. Provisional Patent Application No. 62/610,484, filed on Dec. 26, 2017, the contents of which are incorporated herein by reference in their entirety.

BACKGROUND

The present disclosure is directed to a system and method for soil remediation, and more specifically to a system and method for soil remediation and optimization making use of pipelines located in the soil.

Arable land is a diminishing and increasingly precious commodity. The world's population is growing 1.1% annually while quality fertile and tillable land is actually decreasing due to pollution, soil nutrient exhaustion, lack of irrigation, poor cultivation techniques, and the expansion of cities and industrial activity. The world is drawing nearer to the point where its population's food requirements exceed the growing capacity of available land using existing technologies. In many areas, contaminated land may be useless for commercial and/or residential redevelopment, requiring further sacrifice of arable farmland to allow urban expansion. Contaminants from untreated land may eventually leach into water tables or adjacent, uncontaminated land, causing illness in local populations, ecological damage, and other hardships.

Soil contamination is generally treated in at least one of three ways. Bioremediation introduces tailored microorganisms to break down contaminants in the soil. Thermal desorption involves heating soil in a rotating dryer to remove or separate contaminants from the soil. Chemical fixation mixes contaminated material with other earthen material, then binds the contaminants in the mixture with chemical additives.

Each of these treatments has flaws. Bioremediation must be adapted to the contaminants and is only effective if microorganisms capable of breaking down the specific contaminants are available. Thermal desorption and chemical fixation require manual removal of a large volume of soil and can be too expensive or complex for developing nations or small farms. These remediation technologies do not take into account the need to enrich the soil and provide irrigation after processing.

A solution is needed that not only optimizes the use of existing arable land available but further cleanses, enriches, and reclaims non-arable land appropriately while putting back into the identified land the required nutrients and organic substances needed to promote environmental regrowth or the production of healthy, contaminant-free foods.

BRIEF SUMMARY

The system for treating land includes at least one pipe loop embedded in a plot of land. A wall of the pipe loop has a plurality of pipe apertures extending therethrough. At least one water main pipe is connected to the pipe loop. At least one drainage trench encircles the plot of land and drains to at least one water storage unit. At least one irrigation pump is interposed between the water storage unit and the water main pipe. A stream of water circulates from the pipe loop to the plot of land to the drainage trench to the water storage unit to the irrigation pump to the water main pipe and back to the pipe loop.

The method for using the above system requires that at least one pipe loop is embedded below an upper surface of a plot of land. A beginning of the pipe loop is connected to an outlet pipe branch of at least one water main pipe. An end of the pipe loop is connected to an inlet pipe branch of the water main pipe. At least one drainage trench is dug completely circumscribing the plot of land. The drainage trench is connected to at least one water storage unit. The drainage trench is lined with permeable membrane and non-permeable membrane. At least one irrigation pump is connected between the water main pipe and the water storage unit. A system controller is connected to the irrigation pump. A stream of water is circulated from the pipe loop to the plot of land to the drainage trench to the water storage unit to the irrigation pump to the water main pipe and back to the pipe loop.

BRIEF DESCRIPTION OF THE DRAWING(S)

FIG. 1a depicts a system diagram of an exemplary embodiment of a land reclaiming and optimizing system. FIG. 1b depicts a partial cross-sectional view of the system installed in the land. FIGS. 1c and 1d depict top sectional and cross-sectional views, respectively, of an exemplary embodiment of a pipe loop.

FIGS. 2a, 2b, 2c, 2d, 2e, and 2f depict a flowchart of an exemplary method for land reclamation.

It should be understood that for clarity, not every part is labeled in every drawing. Lack of labeling should not be interpreted as a lack of disclosure.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

This land reclaiming and optimizing system 100 is a combination of different technologies that can remediate the soil to a normalized level and/or optimize the soil for environmental regrowth or growing crops by adding organics and other necessary nutrients, water, fertilizers etc. System 100 can reduce many soil contaminants, such as, but not limited to, heavy metals, carcinogens, hydrocarbons, volatile organic compounds, and other unwanted soil materials to appropriate normalized levels. If desired, the system 100 can also or instead add the correct water, nutrients, organic fertilizers, and other soil additives to the soil to promote the environmental regrowth or balanced growth of organic crops through existing hydroponics knowledge.

The system 100 allows environmental remediation and/or growth of healthy crops due to the washing and elimination of contaminants in the soil. The system 100 is based on the scientific application of multiple different water processing technologies. The application of these processes through system 100 can provide soil remediation for otherwise blighted areas and change the quality and volumetric output of the world's food supply per acre for generations to come. The further benefit of remediating currently polluted land which has been rendered unusable due to heavy industrial contamination or other environmental factors is creating uncontaminated land that promotes provides a safe environment for living creatures. The system 100 works in tandem with the earth's normal growing, watering, and fertilization processes to promote healthy, organic crop growth and environmental remediation.

Figure 1A:
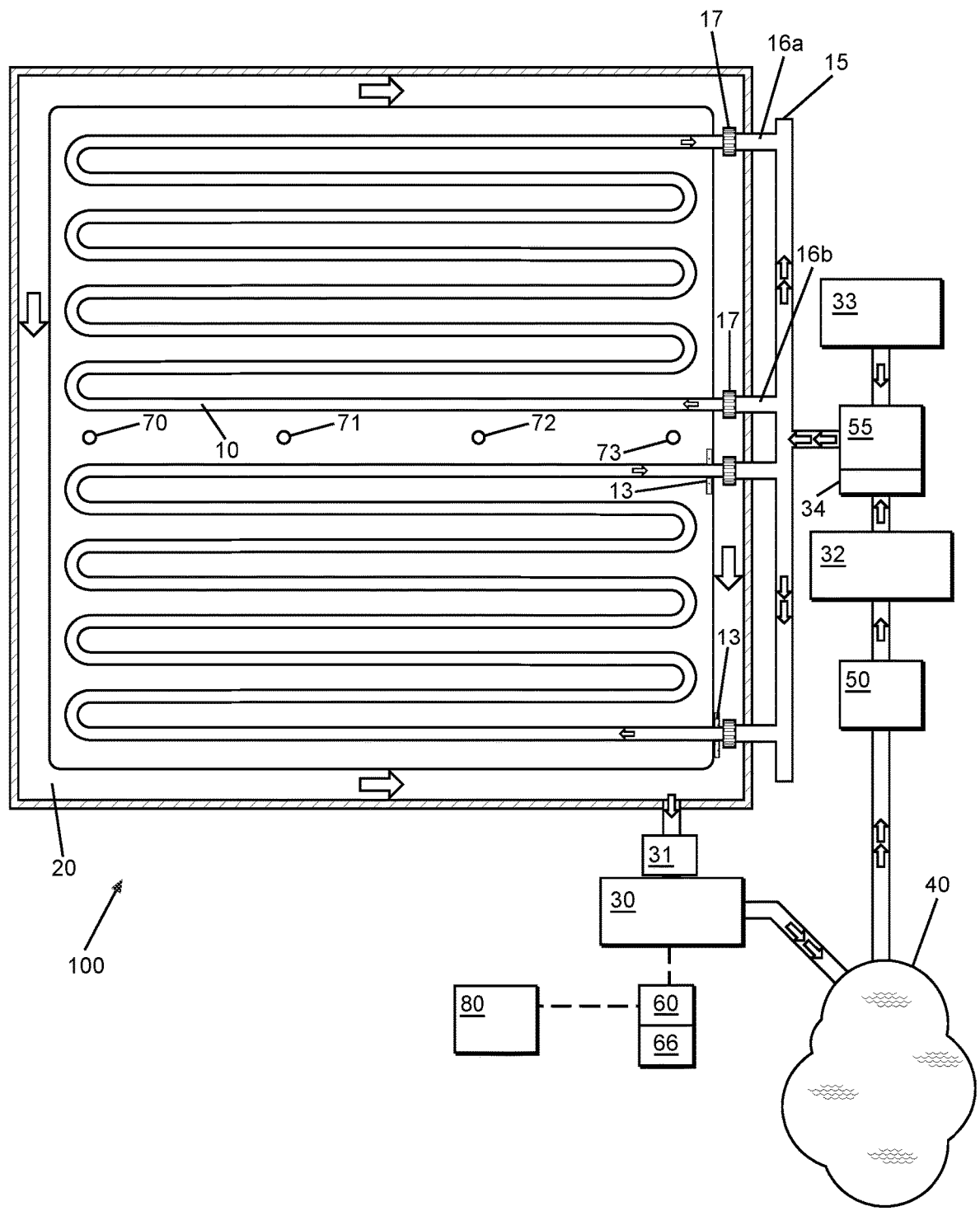
Figure 1D:
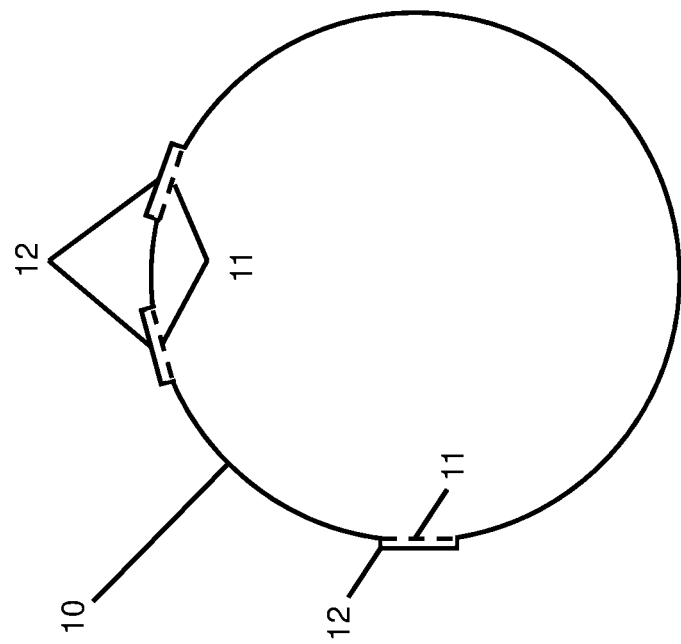
Figure 1C:
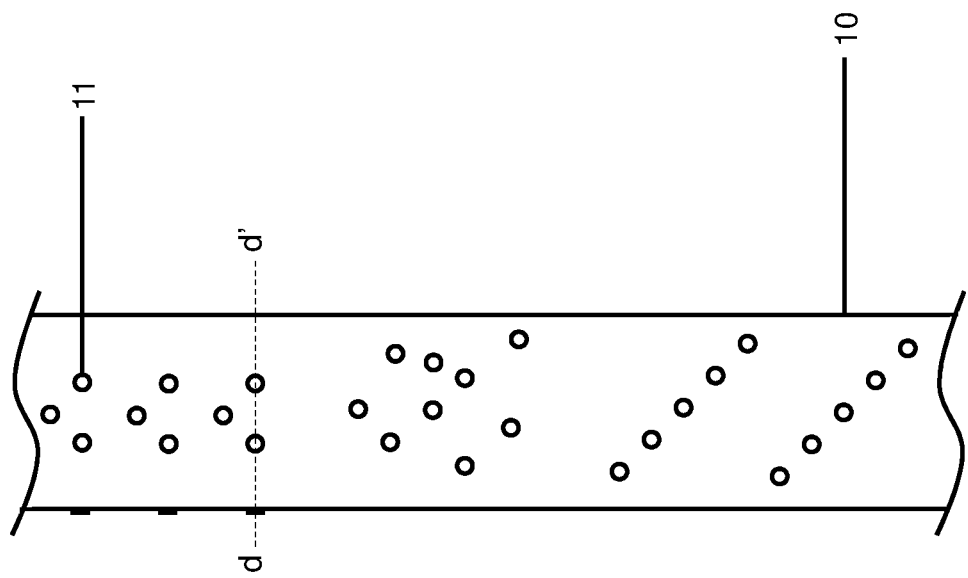

As can be seen in FIGS. 1a and 1b, the system 100 includes multiple pipe loops 10 embedded below the frostline and/or maximum plant root depth of the plot of land to be reclaimed and/or optimized. Ideally, pipe loops 10 are located in topsoil, above a level of slow-draining hardpan to allow the water to flow primarily through the topsoil. Each pipe loop 10 underlies a particular section of the plot of land to be treated, allowing treatment to be customized for that specific area of land. The pipe loops 10 may be a semi-rigid or rigid material with pipe apertures 11 extending through the walls of pipe loop 10 to allow delivery of water, fertilizer, nutrients, and other fluid soil additives, as can be seen in FIG. 1c. The pipe apertures 11 do not necessarily extend through the uppermost point of the walls, nor do they necessarily form a regular or linear progression, as can be seen in FIGS. 1c and 1d. The pipe apertures 11 may also be grouped at intervals, as can be seen in FIG. 1c.

The pipe loops 10 may extend along the length and/or width of the land to be treated or terminate or curve at a point partially the length and/or width of the land to be treated. The pipe loops 10 may be straight, curved, or double back one or more times along their length. In other embodiments, pipe loops 10 may have a crisscrossing and/or multilevel configuration. Pipe loops 10 may also form a meshed pipe network.

The pipe apertures 11 may be fitted with aperture non-return valves 12 to prevent soil, abnormally long roots, and other debris from entering pipe loop 10. Emplacement of pipe loops 10 may be accomplished by horizontal drilling and pipe deployment, and/or by manually or mechanically digging or plowing a trench in the land and laying pipe loops 10 in place. In certain embodiments using horizontal drilling, the drilling gel used to assist in drilling may be loaded with soil-remediation additives to improve soil-remediation capabilities of system 100 or soil-improving additives to allow additional soil optimization. In certain embodiments, fluid-resistant membranes 13 are placed extending from the circumference of pipe loop 10 to seal pipe loop 10 to the soil and prevent water from surfacing prematurely. This assures that the soil pressure is maintained and that the water takes an appropriate path through the soil before entering a drainage trench 20. Membranes 13 may be hygroscopic membranes and may be placed where pipe loop 10 enters or exits the soil and/or enters or exits drainage trench 20.

The pipe loops 10 are connected to at least one water main pipe 15 through outlet and inlet pipe branches 16a and 16b, respectively. The outlet pipe branch 16a connects the beginning of pipe loop 10 to one water main pipe 15 to receive treated water. The corresponding inlet pipe branch 16b connects the end of pipe loop 10 to the same water main pipe 15 to return any remaining treated water. Each water main pipe 15 may have more than one pair of outlet and inlet pipe branches 16a and 16b. Both outlet and inlet pipe branches 16a and 16b may include one or more branch valves 17. The branch valves 17 may be mechanical or may be actuated by an electronic or manual controller. Such selective actuation permits fluid delivery through specific pipe loops 10 or precise groups thereof to allow targeted treatment of different areas of the land. One-way branch valves 17 can also prevent backflow into pipe loop 10 or water main pipe 15.

After water is expelled from pipe loops 10, the water travels through the soil, removing or binding contaminants and/or depositing soil additives. Excess water, which may be laden with contaminants and/or surplus additives, travels to the edges of the land, which are completely surrounded along the periphery by drainage trench 20. The drainage trench 20 is lined at the bottom with a liquid-impermeable membrane 21 to prevent the water from carrying contaminants or excess soil additives to other areas. The sides of drainage trench 20 may be lined with liquid-impermeable membrane 21 or a liquid-permeable membrane 22, but at least one side is lined with liquid-permeable membrane 22 to allow liquid to pass from the field to drainage trench 20.

In certain embodiments where large areas of land are treated, the land so surrounded may be subdivided by additional drainage trench(es) 20 into individual fields, each with their own set of pipe loops 10, but sharing mutually bordering drainage trenches 20 and/or certain of the remaining components of system 100. As can be seen in FIG. 1b, both sides of drainage trench 20 between remediated fields are lined with liquid-permeable membrane 22 to allow both fields to drain into the same trench. Between a remediated field and an unremediated field, the side of drainage trench 20 next to the remediated field is lined with liquid-permeable membrane 22, while the side next to the unremediated field is lined with liquid-impermeable membrane 21 to prevent liquid from passing between fields.

In certain embodiments, drainage trench 20 drains to a water storage unit 40 through a high-volume water processor 30, which removes and/or breaks down chemical and/or particulate contaminants, such as, but not limited to, volatile organic compounds, hydrocarbons, heavy metals, munitions residue, agrochemicals, salts, and human and animal waste. In certain embodiments, water processor 30 includes or is in line with an ionization unit 31 to provide ozone- and hydroxide-ionization assisted breakdown of contaminants. The water processor 30 may be a high-volume water cleaning unit, such as, but not limited to, the water processors used in cleaning fracking water.

The water processor 30 may utilize water processing methodologies such as, but not limited to, deionization, biological water treatment (with or without media filtration), ozonation, hydroxide ($OH^-$) dosing, water softening, distillation and vapor distillation, ultraviolet radiation, electrostatic water treatment, flocculation, filtration, and any combination thereof. The water processor 30 may utilize filtration methodologies such as, but not limited to, reverse osmosis filtration, sediment filtration, sand filtration, filtration with commercially available media (such as, but not limited to, Kinetic Degradation Fluxion redox filtration media, Aqua Treatment Services filters, etc.), activated carbon filtration, nanoscale or graphene membrane filtration, electrodialysis, filtration with activated alumina ($Al_2O_3$), and any combination thereof. The water processor 30 may utilize sediment removal methodologies such as, but not limited to, weirs, centrifugal separation, gravity separators, coarse membranes or media with backwashing, Y strainers, spin down strainers, and any combination thereof.

Water processed by water processor 30 is transferred to water storage unit 40. In one embodiment, water storage unit 40 is a storage pond lined with another liquid-impermeable membrane 21. In another embodiment, water storage unit 40 is a closed, partially open, or open storage tank. In still another embodiment, water storage unit 40 includes multiple water storage units 40 connected in series, in parallel, or in any combination thereof. Sediment in the water can settle in water storage unit 40 to prevent migration to and clogging or damage of other parts of system 100. This sediment settling may be in addition to or in place of sediment removal by water processor 30. The water storage unit 40 may also incorporate any of the above-listed sediment removal methodologies.

A filtration pump 55 can pump water from water storage unit 40 to a filtration unit 32 for additional processing. In one embodiment, filtration unit 32 uses reverse osmosis filtration to further remove contaminants from water. Other embodiments may use additional and/or alternative filtration technologies, such as any of the above-listed filtration methodologies or combinations thereof.

After water passes through filtration unit 32, irrigation pump 55 pressurizes the water for delivery to water main pipe 15. Before entering water main pipe 15, water may be further treated by various treatment units connected to irrigation pump 55 or the water lines leading thereto. At least one additive unit 33 may provide additional soil additives or additives that assist in soil remediation, such as, but not limited to, chemical binders or degraders. Such additives may be added using, by way of non-limiting example, metering pumps, venturi pumps, line injection, various mixing and/or blowing processes, and any combination thereof.

An additional ionization unit 31 may treat water before it enters the land to allow effective in situ breakdown of contaminants. A heater unit 34 may increase the water temperature to heat the land, allowing earlier planting and germination. The heater unit 34 is a liquid heater such as, but not limited to, a thin film heater, a ceramic heater, a resistive heater, a solar heater, a geothermal heat pump, a fossil fuel-based heater, a friction heater, a thermo-electric heater, and any combination thereof. Additional and/or duplicative treatment units in any combination may be added at any stage to utilize any of the above treatment, water processing, sediment removal, and/or filtration methodologies.

The branch valves 17, water processor 30, ionization unit(s) 31, filtration unit 32, additive unit 33, heater unit 34, water storage unit 40, filtration pump 50, and/or irrigation pump 55 may be controlled by a system controller 60. The system controller 60 may allow automatic and/or manual monitoring of the land under treatment or any system component through at least one moisture sensor 70, chemical sensor 71, temperature sensor 72, pressure sensor 73, flow sensor 74, and any combination thereof. Other sensors, such as, but not limited to, pH and light sensors, may also be used. These sensors may be integrated into system components and/or placed throughout the land under treatment.

By way of non-limiting example, in one embodiment pressure sensor 73 detects abnormal pressure spikes or drops within pipe loop 10 that may indicate damage to or blockage of pipe loop 10. By way of non-limiting example, in another embodiment flow sensor 74 detects abnormal water flow within pipe loop 10 that may indicate damage to or blockage of pipe loop 10. By way of non-limiting example, in another embodiment chemical sensor 71 detects the amount of soil additive left in water flowing into inlet pipe branch 16b to prevent over-enrichment of the soil.

Data collected from the various system components may be stored on controller data storage 66. In one embodiment, controller data storage 66 is cloud storage. The system controller 60 may be connected via a wired and/or wireless connection to any of the above components of system 100. The system controller 60 may receive status updates, treatment feedback, sensor data, and user input, transmit control signals and output data to users and controller data storage 66, and automatically calculate adjustments required to any part of system 100 to maintain a given level of operations or follow a course of treatment.

The system controller 60 may directly control system components or may send commands to sub-controllers regulating individual components or groups of components. Embodiments for very large remediation and/or optimization operations may use multiple controllers 60 operating independently or slaved to a master controller 80, which functions similarly to controller 60, but with increased storage and processing power to allow control over a more complex system 100. The controller 60 may completely automate all aspects of regulating system 100, require manual input of all controlling factors, or provide limited automation with user setup, manual intervention, and/or user approval required for certain exceptions.

The system controller 60 may use operational profiles 90 including differing operational parameters. Operational parameters are the system and/or component commands and/or settings necessary for treatment of a given contaminant or set of contaminants in a given environment, or for optimization of a given area of land in a given environment. Operational profiles 90 may have completely pre-set parameters, have some customizable parameters, or require user input of all parameters. Parameters may be based on contaminants, intended future crops or other plants, soil types, field configurations, drainage, weather conditions, existing or available system components, any other required or optional variables, and any combinations thereof. Operational profiles 90 may also differ based on intended end-uses of the land.

By way of non-limiting examples, the operational profile 90 for remediating chromium contamination from a level field with shallow sandy clay soil in a cold, arid environment may be very different from remediating cyclonite contamination from a sloping field with deep silty loam soil in a warm, humid environment. The operational profile 90 for optimizing soil for growing barley in a hilly field with nutrient-deficient clay loam in a savanna environment may also be different from optimizing soil for growing early-germinating soybeans in a terraced field with sandy loam soil in an oceanic environment. The operational profile 90 for remediating contaminated land for use in growing crops may be different from that for remediating contaminated land for use in a commercial development.

Soil scanning via various methods, in advance of remediation, is beneficial in determining the likely success of the remediation. Lack of consistency in the level or speed of water drainage to deeper depths beneath the surface of the earth can create significant issues. By way of non-limiting example, an old well drilled in a field can eliminate or reduce the ability to create the necessary back pressures in the soil to push the contaminated water to the surface and into drainage trench 20. In such a case, the decision may be made to use other methods of treatment, modify the subsurface, or only treat part of a field.

The system 100 may be used in multiple configurations through two different phases: (1) remediation and (2) optimization. It should be understood that the specific arrangement of the elements of system 100 may be restructured as long as the fundamental function of system 100 remains unaltered.

In the first phase, at least the pipe loops 10, water main pipe 15, drainage trench 20, water processor 30, filtration unit 32, water storage unit 40, filtration pump 50, and irrigation pump 55 are used to remediate contaminated land. A stream of water circulates from pipe loop 10 to the land to drainage trench 20 to water processor 30 to water storage unit 40 to filtration pump 50 to filtration unit 32 to irrigation pump 55 to water main pipe 15, then back into pipe loop 10 for another cycle of remediation. With each cycle, contaminants are flushed from the land by the water, which is purified of contaminants and reused.

Once the land is remediated, water processor 30, filtration unit 32, and filtration pump 50 may be removed to allow system 100 to function as a soil treatment system in phase two. Embodiments which also used sensors, ionization unit 31, additive unit 33, and/or heater unit 34 may remove some or all of these components. In return, a user may add different or additional sensors, additive unit 33, and/or heater unit 34 to assist in optimizing the land during phase two. In certain embodiments, phase one may be omitted entirely and system components placed only to enable immediate soil treatment.

As shown in the flowchart of FIGS. 2a through 2f, the following method 200 addresses installation and use of system 100 to remediate contaminated land. It should be understood that the arrangement of the steps of method 200 may be reordered as long as the fundamental function of method 200 remains unaltered.

Figure 2A:
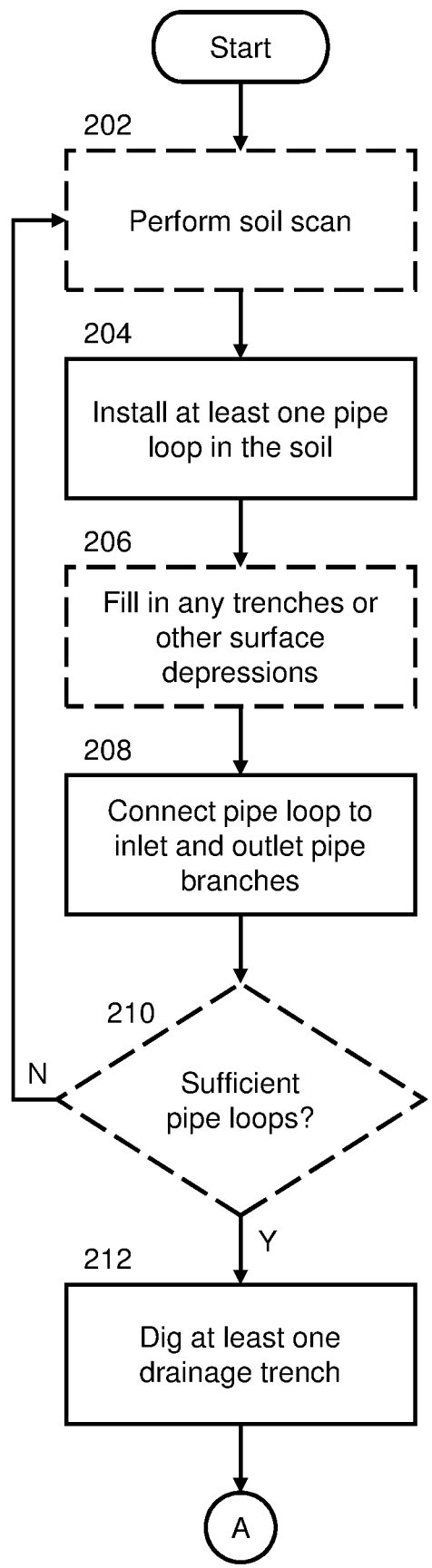

As shown in FIG. 2a, in optional step 202, a soil scan is performed to determine the likelihood of success using system 100.

In step 204, at least one pipe loop 10 is installed in the soil, embedded below an upper surface of the land and optionally sealed to the soil using membrane 13. Embedding may be by horizontal drilling and pipe deployment, and/or by digging or plowing a trench in the land and laying pipe loop 10 in place.

In optional step 206, any trenches or other surface depressions resulting from installation of pipe loop 10 are filled in with soil. Soil compacting may be required to help ground pressures remain consistent.

In step 208, the beginning of pipe loop 10 is connected to an outlet pipe branch 16a of at least one water main pipe 15 and the end of pipe loop 10 is connected to a corresponding inlet pipe branch 16b of the water main pipe 15.

In optional step 210, steps 202 through 208 are repeated until the entire area to be remediated has sufficient pipe loops 10 to cover the area for remediation.

In step 212, at least one drainage trench 20 is dug completely circumscribing the area to be remediated and connected to at least one water storage unit 40. Additional interconnected drainage trenches 20 may be dug to subdivide the area and separate various groups of pipe loops 10.

Figure 2B:
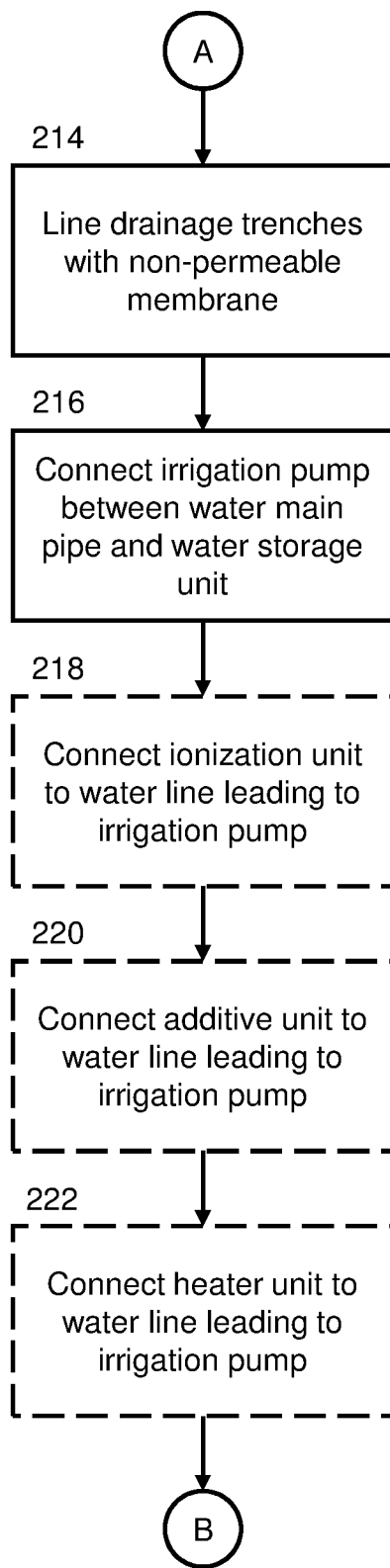

As shown in FIG. 2b, in step 214, drainage trenches 20 are lined with non-permeable membrane 21 and permeable membrane 22.

In step 216, irrigation pump 55 is connected between water main pipe 15 and at least one water storage unit 40.

In optional step 218, ionization unit 31 is connected to the water line leading to irrigation pump 55.

In optional step 220, additive unit 33 is connected to the water line leading to irrigation pump 55.

In optional step 222, heater unit 34 is connected to the water line leading to irrigation pump 55.

Figure 2C:
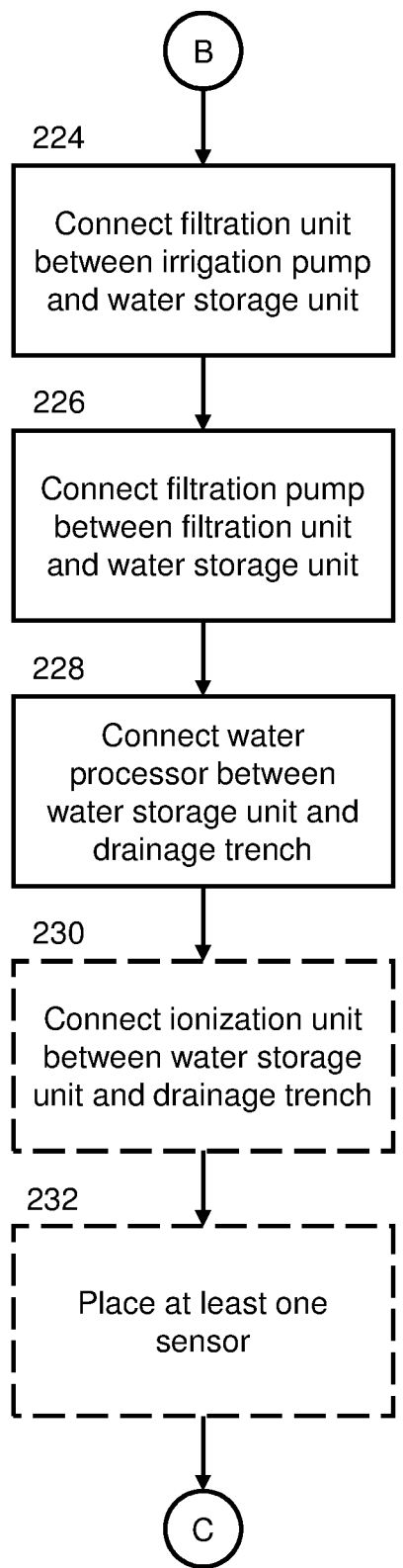

As shown in FIG. 2c, in step 224, filtration unit 32 is connected between irrigation pump 55 and water storage unit 40.

In step 226, filtration pump 50 is connected between filtration unit 32 and water storage unit 40.

In step 228, water processor 30 is connected between water storage unit 40 and drainage trench 20.

In optional step 230, ionization unit 31 is also connected between water storage unit 40 and drainage trench 20.

In optional step 232, at least one moisture sensor 70, chemical sensor 71, temperature sensor 72, pressure sensor 73, and/or flow sensor 74 are placed in or on at least one of the above components of system 100 or the area to be remediated.

Figure 2D:
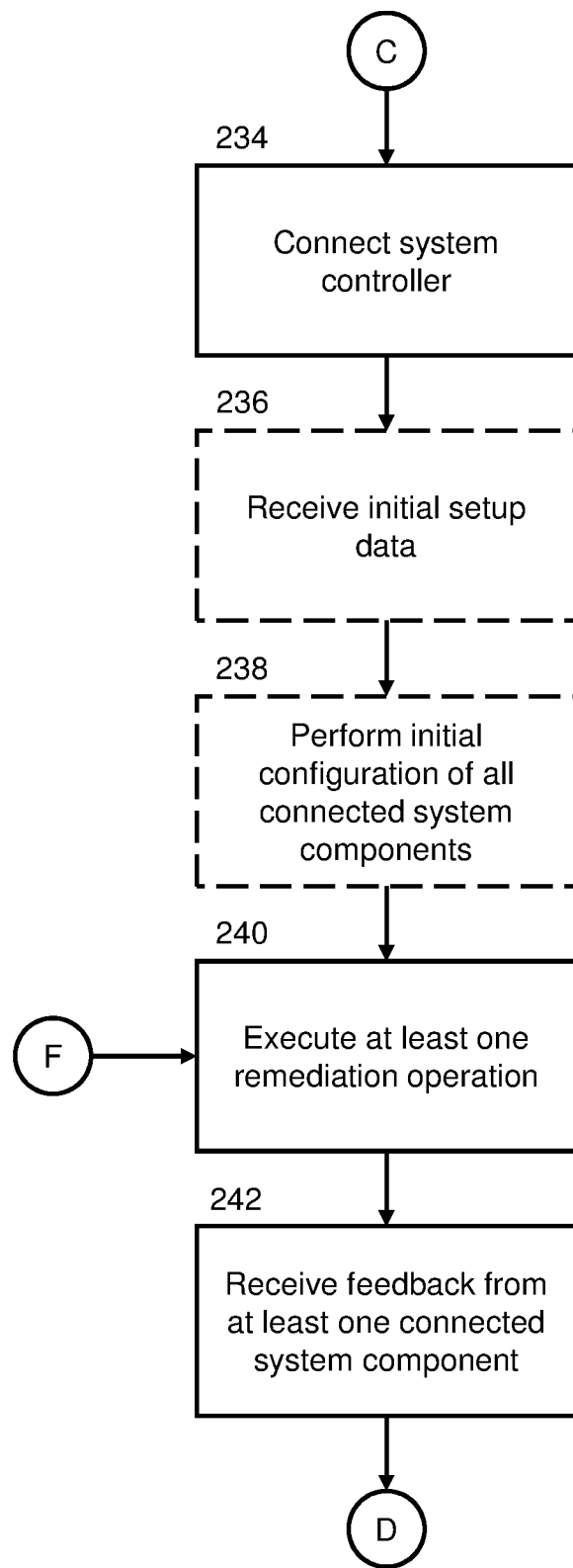

As shown in FIG. 2d, in step 234, system controller 60 is connected to all installed system components that require control or provide data.

In optional step 236, system controller 60 receives initial setup data from all connected system components and/or from at least one user.

In optional step 238, system controller 60 performs an initial configuration of all connected system components based on the initial setup data obtained in step 236.

In step 240, system controller 60 executes at least one remediation operation in the area to be remediated. This operation at a minimum circulates a stream of water from pipe loop 10 to the land to drainage trench 10 to water storage unit 40 to irrigation pump 55 to water main pipe 15 and back to pipe loop 10.

In step 242, system controller 60 receives feedback from at least one connected system component.

Figure 2E:
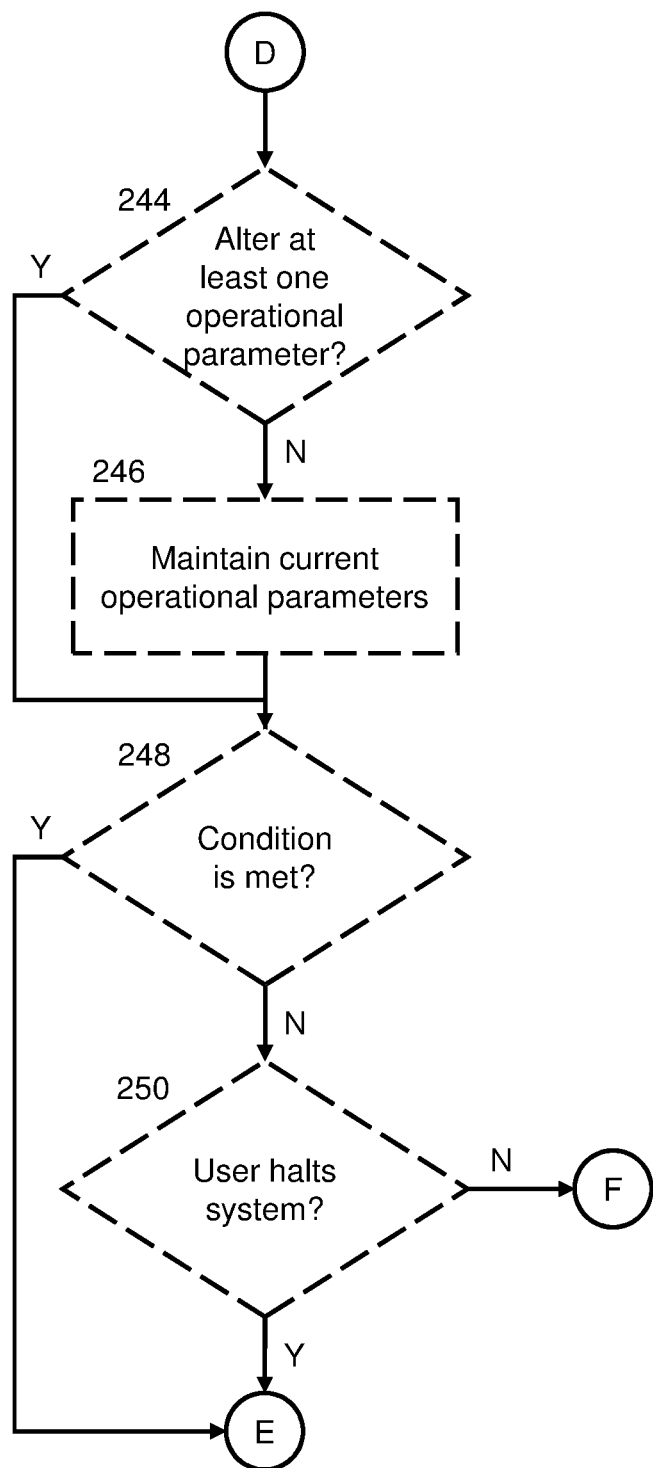

As shown in FIG. 2e, in optional step 244, system controller 60 alters at least one operational parameter based on the feedback obtained in step 242, the time, and/or the cycle number.

In optional step 246, system controller 60 maintains current operational parameters based on the feedback obtained in step 242, the time, and/or the cycle number.

In optional step 248, system controller 60 repeats steps 240 through 246 until the contamination reaches a preset level, a predetermined time elapses, a predetermined number of cycles pass, and/or another predetermined condition is met.

In optional step 250, system controller 60 repeats steps 240 through 246 until the user stops system 100 from repeating steps 240 through 246.

Figure 2F:
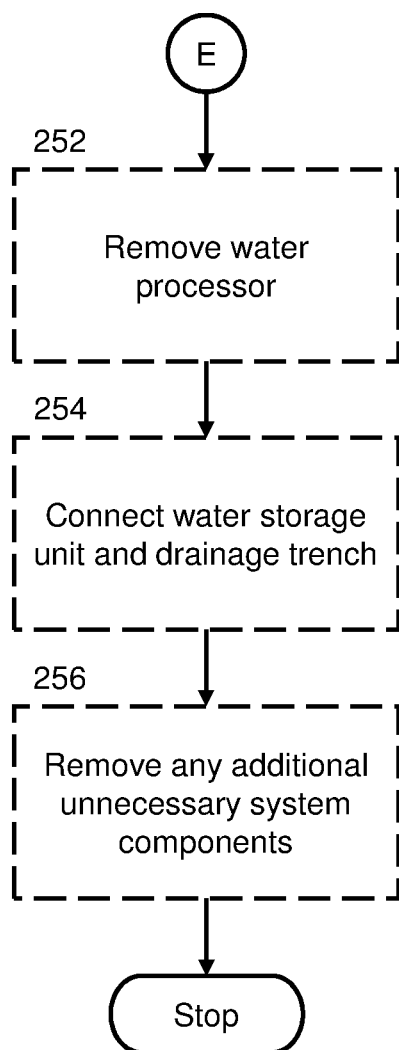

As shown in FIG. 2f, in optional step 252, water processor 30 is removed.

In optional step 254, water storage unit 40 and drainage trench 20 are directly connected.

In optional step 256, any additional unnecessary system components are removed.

Figure 3A:
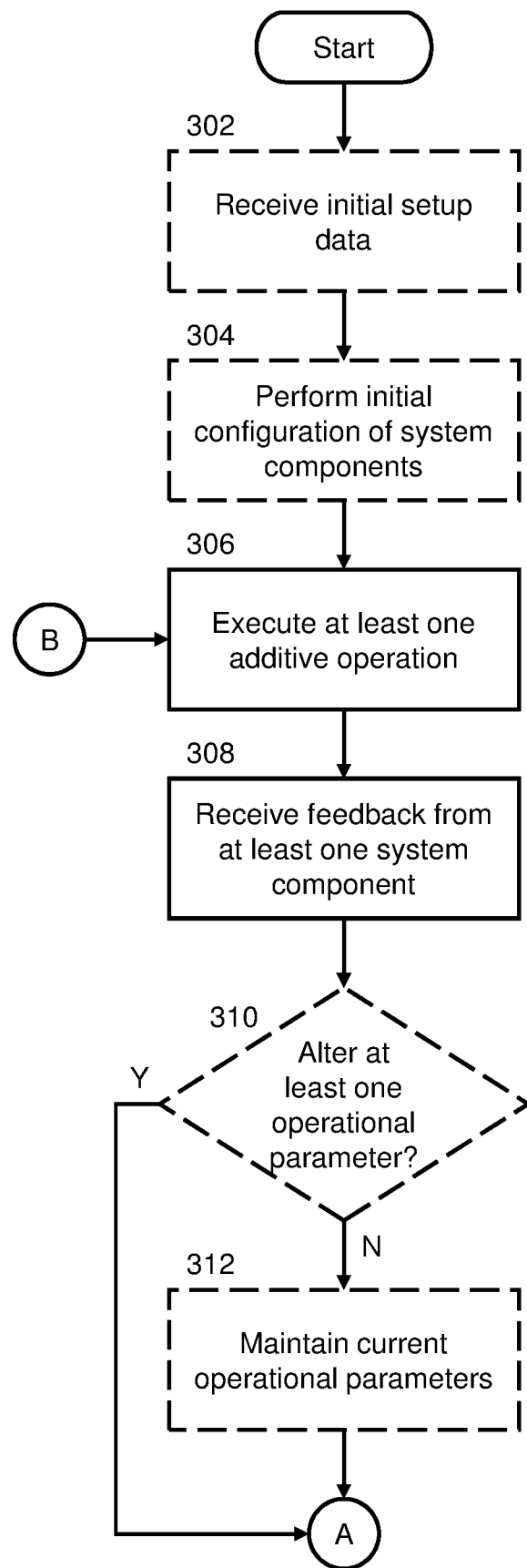
FIGS. 3a and 3b depict a flowchart of an exemplary method for optimizing land.
Figure 3B:
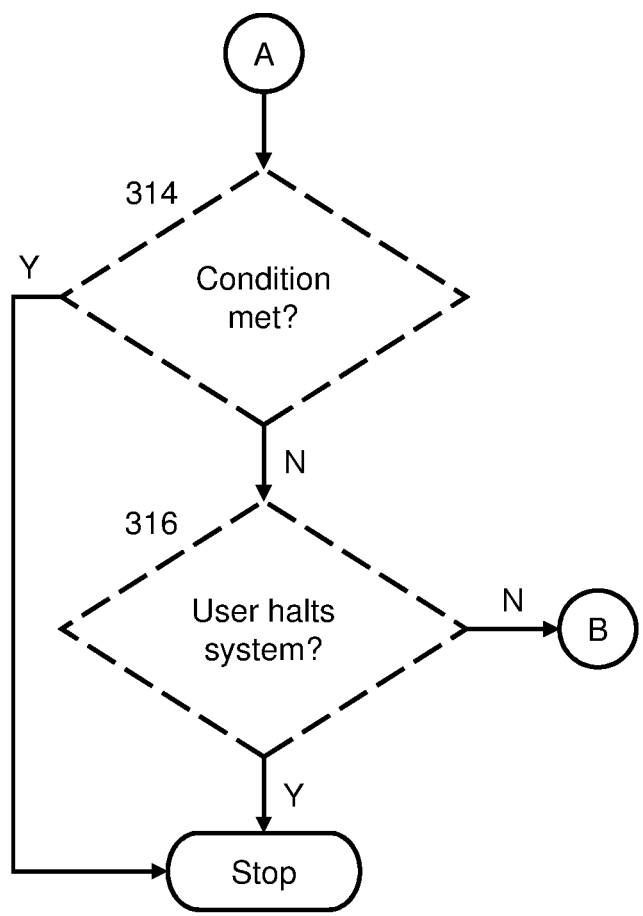

As shown in FIGS. 3a and 3b, the following method 300 addresses use of system 100 to optimize land through delivery of water, either as pure water for irrigation or with at least one additional soil additive. Before step 302, any of steps 202-216, 220-226, 232, and/or 234 of method 200 may be used to install various components of system 100 if removal of contaminants from the land is unnecessary beforehand. It should be understood that the arrangement of the steps of method 300 may be reordered as long as the fundamental function of method 300 remains unaltered.

As shown in FIG. 3a, in optional step 302, system controller 60 receives initial setup data from all connected system components and/or from at least one user.

In optional step 304, system controller 60 performs an initial configuration of all connected system components based on the initial setup data obtained in step 302.

In step 306, system controller 60 executes at least one additive operation in the area to be optimized.

In step 308, system controller 60 receives feedback from at least one connected system component.

In optional step 310, system controller 60 alters at least one operational parameter based on the feedback obtained in step 308, the time, and/or the cycle number.

In optional step 312, system controller 60 maintains current operational parameters based on the feedback obtained in step 308, the time, and/or the cycle number.

As shown in FIG. 3b, in optional step 314, system controller 60 repeats steps 306 through 312 until the amount of soil additive in the soil reaches a preset level, a predetermined time elapses, a predetermined number of cycles pass, and/or another predetermined condition is met.

In optional step 316, system controller 60 repeats steps 306 through 312 until the user manually halts system 100.

Figure 4:
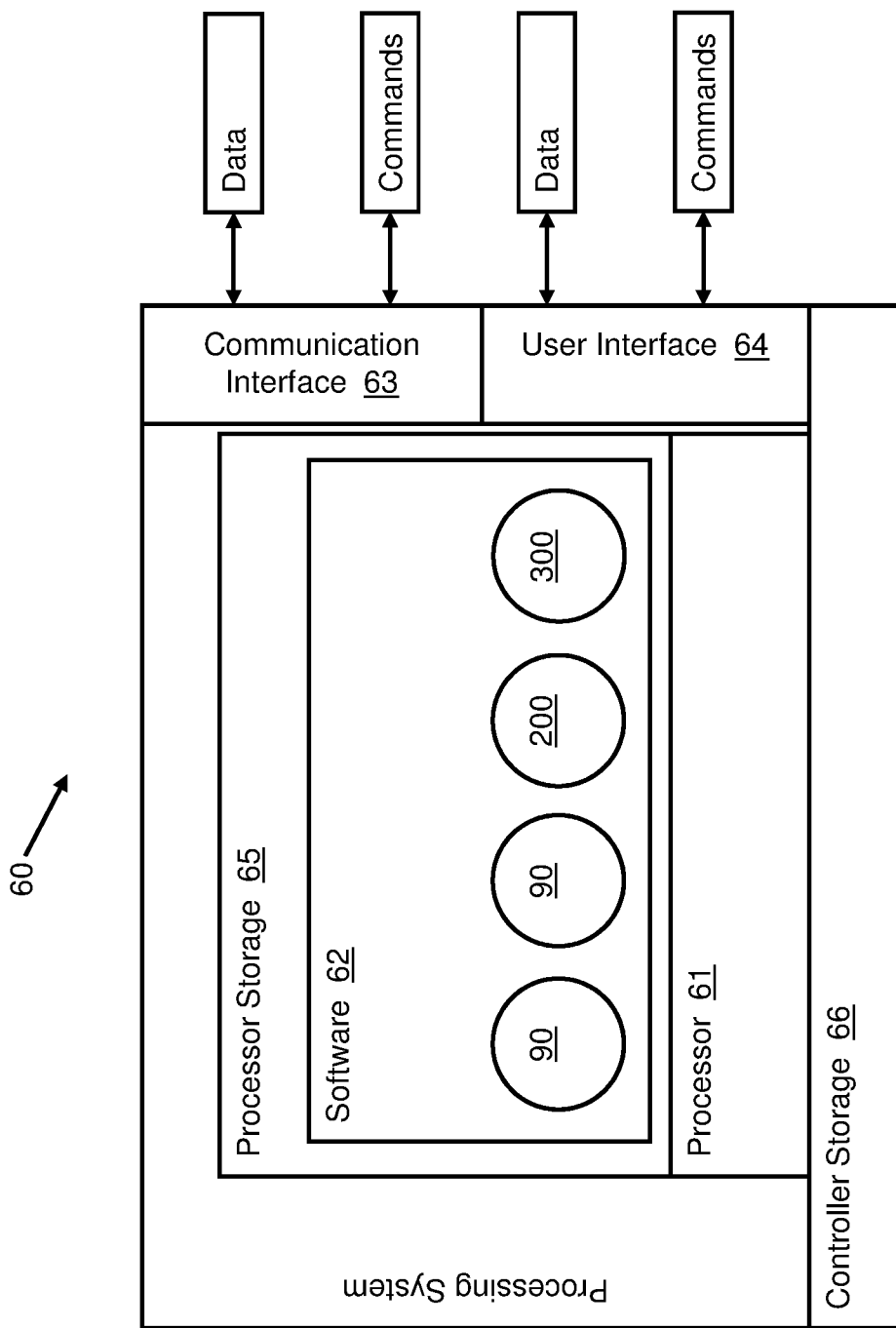
FIG. 4 depicts a system diagram of an exemplary embodiment of a controller for the land reclaiming and optimizing system.

FIG. 4 depicts an exemplary embodiment of controller 60 in system 100.

The controller 60 is generally an independent processing system that includes a processor 61, software 62, a communication interface 63, a user interface 64, a processor storage 65, and a controller data storage 66. The processor 61 loads and executes software 62 from processor storage 65, including at least one operational profile 90 containing commands, data values/ranges, and variables for at least one specific type of operation, as detailed above. When executed by controller 60, software 62 directs the processor 61 to operate as described in herein in accordance with certain steps of methods 200 and 300.

The controller 60 includes software 62 for controlling and modifying the functioning of system 100. While the description as provided herein refers to a controller 60 and a processor 61, it is to be recognized that implementations of such controllers can be performed using one or more processors 61, which may be communicatively connected, and such implementations are considered to be within the scope of the description. It is also contemplated that these components of controller 60 may be operating in a number of physical locations.

The processor 61 can comprise a microprocessor and other circuitry that retrieves and executes software 62 from controller data storage 66. The processor 61 can be implemented within a single processing device but can also be distributed across multiple processing devices or sub-systems that cooperate in existing program instructions. Examples of processors 61 include general purpose central processing units, application specific processors, and logic devices, as well as any other type of processing device, combinations of processing devices, or variations thereof.

The controller data storage 66 can comprise any storage media readable by processor 61, and capable of storing software 62. The controller data storage 66 can include volatile and non-volatile, removable and non-removable media implemented in any method or technology for storage of information, such as computer readable instructions, data structures, program modules, or other information. The controller data storage 66 can be implemented as a single storage device but may also be implemented across multiple storage devices or sub-systems. The controller data storage 66 can further include additional elements, such a controller capable of communicating with the processor 61.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 100.

As described in further detail herein, controller 60 receives and transmits data through communication interface 63. The data can include data from sensors 70 through 74, data to be recorded by controller data storage 66, and/or data received from user interface 64. In embodiments, the communication interface 63 also operates to process data prior to sending and/or after receiving the data. Data processing can include packetization, digitization, format conversion, encryption, and/or the reverse of such processes.

The user interface 64 can include one or more input devices such as, but not limited to, a mouse, a keyboard or keypad, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display data or current status of system components. Speakers, printers, haptic devices and other types of output devices may also be included in the user interface 64. Users can communicate with controller 60 through the user interface 64 in order to enter or receive data, set initial parameters, set stop parameters, or any number of other tasks the user may want to complete with controller 60.

In the foregoing description, certain terms have been used for brevity, clearness, and understanding. No unnecessary limitations are to be inferred therefrom beyond the requirement of the prior art because such terms are used for descriptive purposes and are intended to be broadly construed. Any different configurations, systems, and method steps described herein may be used alone or in combination with other configurations, systems, and method steps. It is to be expected that various equivalents, alternatives, and modifications are possible within the scope of the appended claims.

What is claimed is:

1. A method for treating land, comprising:
    circulating a stream of water such that the stream of water travels from at least one pipe loop to a plot of land in which the pipe loop is embedded,
    continuing to circulate the stream of water such that the stream of water drains by way of gravity through a surface of at least one drainage trench to the at least one drainage trench, wherein the at least one drainage trench is lined along at least one surface with a liquid-permeable membrane, and
    continuing to circulate the stream of water such that the stream of water travels from the drainage trench and back to the at least one pipe loop.

2. The method of claim 1, further comprising:
    transmitting feedback from at least one system control component to at least one system controller; and modifying an operating parameter of a system based on the feedback.

3. The method of claim 2, wherein modifying the operating parameter of the system is performed by the system controller.

4. The method of claim 2, wherein modifying the operating parameter of the system is performed by a user.

5. The method of claim 2, wherein modifying the operating parameter of the system is based on a chemical level detected by at least one chemical sensor.

6. The method of claim 2, wherein modifying the operating parameter of the system is based on a time of operation.

7. The method of claim 1, further comprising increasing content of an additive in the plot of land by circulating the stream of water, wherein the stream of water carries the additive which remains in the plot of land when the stream of water drains.

8. The method of claim 7, wherein the additive is an organic additive.

9. The method of claim 7, further comprising selecting the additive based on a crop currently growing or intended to be grown in the plot of land.

10. The method of claim 1, further comprising increasing moisture content of the plot of land by circulating the stream of water and at least a portion of the stream of water remaining in the plot of land.

11. The method of claim 1, further comprising increasing soil temperature of the plot of land by circulating the stream of water, wherein the stream of water is heated to a temperature above the soil temperature.

12. The method of claim 1, further comprising removing at least one contaminant from the plot of land by circulating the stream of water and having at least a portion of the at least one contaminant drain to the at least one drainage trench with the stream of water.

13. The method of claim 1, further comprising repeating circulating the stream of water until a predetermined condition is met.

14. The method of claim 1, further comprising repeating circulating the stream of water until a user manually halts a system.

15. The method of claim 1, further comprising connecting at least one system controller to at least one system control component, wherein the system control component is selected from the group consisting of: a pump, a sensor, a valve, a water processor, an ionization unit, a filtration unit, an additive unit, and a heater unit.

16. The method of claim 1, further comprising connecting at least one additional system component to the system or removing at least one additional system component from the system, wherein the at least one additional system component is selected from the group consisting of: a pipe loop, a water main pipe, a water storage unit, a pump, a sensor, a valve, a water processor, an ionization unit, a filtration unit, an additive unit, and a heater unit.

17. The method of claim 16, further comprising pumping the stream of water to the water processor between the at least one drainage trench and the at least one pipe loop.

18. The method of claim 16, further comprising pumping the stream of water to the ionization unit between the at least one drainage trench and the at least one pipe loop.

19. The method of claim 16, further comprising pumping the stream of water to the filtration unit between the at least one drainage trench and the at least one pipe loop.

20. The method of claim 16, further comprising combining an additive with the stream of water between the at least one drainage trench and the at least one pipe loop.

* * * * *